(12) United States Patent
Sherin

(10) Patent No.: US 11,643,143 B2
(45) Date of Patent: May 9, 2023

(54) SPHERICAL WHEEL LEANING SYSTEMS FOR VEHICLES

(71) Applicant: Keph Sherin, Lake Oswego, OR (US)

(72) Inventor: Keph Sherin, Lake Oswego, OR (US)

(*) Notice: Subject to any disclaimer, the term of this patent is extended or adjusted under 35 U.S.C. 154(b) by 638 days.

(21) Appl. No.: 16/675,633

(22) Filed: Nov. 6, 2019

(65) Prior Publication Data

US 2020/0140014 A1 May 7, 2020

Related U.S. Application Data

(60) Provisional application No. 62/756,485, filed on Nov. 6, 2018.

(51) Int. Cl.
| | |
|---|---|
| B62D 17/00 | (2006.01) |
| B60G 3/00 | (2006.01) |
| B60B 19/14 | (2006.01) |
| B60G 15/06 | (2006.01) |
| B60G 3/20 | (2006.01) |

(52) U.S. Cl.
CPC .............. B62D 17/00 (2013.01); B60B 19/14 (2013.01); B60G 3/00 (2013.01); B60G 15/062 (2013.01); B60G 3/20 (2013.01); *B60G 2202/31* (2013.01); *B60G 2500/30* (2013.01)

(58) Field of Classification Search
CPC ........ B62D 17/00; B62D 15/00; B60B 19/14; B60G 3/00; B60G 15/062; B60G 3/20; B60G 2202/31; B60G 2500/30; B60G 2200/46; B60G 2204/4192; B60G 3/26
See application file for complete search history.

(56) References Cited

U.S. PATENT DOCUMENTS

| | | | |
|---|---|---|---|
| 1,301,139 A | * | 4/1919 | Laskowski .............. B60B 33/08 |
| | | | 16/26 |
| 4,303,224 A | * | 12/1981 | Nelson .................... B62D 17/00 |
| | | | 254/131 |
| 4,423,795 A | | 1/1984 | Winchell et al. |
| 4,592,570 A | | 6/1986 | Nassiri |
| 4,683,973 A | * | 8/1987 | Honjo .................. B60K 17/303 |
| | | | 280/47.11 |
| 5,072,960 A | | 12/1991 | Sperko |
| 5,927,424 A | | 7/1999 | Van Den Brink et al. |
| 5,927,736 A | | 7/1999 | Salfinger et al. |

(Continued)

FOREIGN PATENT DOCUMENTS

JP 2001104394 A 4/2001

*Primary Examiner* — Paul N Dickson
*Assistant Examiner* — Timothy Wilhelm
(74) *Attorney, Agent, or Firm* — Morrison & Foerster LLP

(57) ABSTRACT

A suspension system for a vehicle is disclosed. In some embodiments, the suspension system includes a wheel arch. In some embodiments, a wheel arch includes a gear track. In some embodiments, a wheel axle is coupled to a first and a second end of the wheel arch. In some embodiments, a steradian shaped wheel is mounted on the wheel axle. In some embodiments, a motor frame is coupled to a chassis of the vehicle. In some embodiments, the motor frame includes a lean motor configured to engage with the gear track. In some embodiments, actuation of the lean motor causes the wheel arch to rotate along an axis perpendicular to the longitudinal axis of the vehicle to create a change in a camber angle of the wheel.

19 Claims, 8 Drawing Sheets

(56) References Cited

U.S. PATENT DOCUMENTS

| | | | |
|---|---|---|---|
| 6,637,758 B2* | 10/2003 | Woo | B60G 3/26 |
| | | | 280/5.521 |
| 8,272,650 B2* | 9/2012 | Freund | B60G 17/021 |
| | | | 280/5.506 |
| 8,973,929 B1* | 3/2015 | Seo | B60G 17/0163 |
| | | | 280/86.752 |
| 9,296,274 B2* | 3/2016 | Gano | B60B 33/006 |
| 9,387,889 B2 | 7/2016 | Ayuzawa et al. | |
| 9,499,220 B2* | 11/2016 | Kermani | B62K 5/025 |
| 10,457,325 B2* | 10/2019 | Zhang | B62D 7/1581 |
| 10,668,771 B2* | 6/2020 | Cherian | B60B 33/08 |
| 10,940,731 B2* | 3/2021 | Tiramani | B60G 7/003 |
| 11,001,298 B2* | 5/2021 | Geiger | B62D 15/00 |
| 11,014,608 B2* | 5/2021 | Quatrano | B60G 17/0162 |
| 2003/0011157 A1* | 1/2003 | Aubarede | B60G 7/008 |
| | | | 280/86.751 |
| 2004/0178595 A1 | 9/2004 | Coggin et al. | |
| 2006/0063137 A1 | 3/2006 | Robbins | |
| 2006/0273530 A1* | 12/2006 | Zuber | B60G 21/052 |
| | | | 280/124.13 |
| 2008/0167160 A1* | 7/2008 | Koike | B60B 19/14 |
| | | | 476/40 |
| 2012/0006602 A1* | 1/2012 | Orenbuch | B60B 19/12 |
| | | | 180/6.2 |
| 2013/0175776 A1* | 7/2013 | Michel | B62D 17/00 |
| | | | 280/86.758 |
| 2020/0223270 A1* | 7/2020 | Kunkel | B60G 7/006 |
| 2021/0155290 A1* | 5/2021 | Chen | B62D 7/18 |
| 2022/0055690 A1* | 2/2022 | Itoh | B62D 5/0418 |

* cited by examiner

SPHERICAL WHEEL LEANING SYSTEMS FOR VEHICLES

CROSS REFERENCE TO RELATED APPLICATIONS

This application claims priority to U.S. Provisional Application No. 62/756,485, filed on Nov. 6, 2018, the contents of which are incorporated by reference herein in their entirety.

FIELD OF THE DISCLOSURE

This application relates generally to suspension systems for vehicles, and more specifically, suspension systems that allow for dynamic adjustment of wheel camber angle.

BACKGROUND OF THE DISCLOSURE

Vehicle suspension systems typically implement a fixed wheel camber angle, which is the angle between the vertical axis of the wheel and the vertical axis of the vehicle. For example, in vehicles intended for use on a race course, a fixed negative wheel camber may be used. A negative camber refers to when the top of the wheel is closer to the vehicle than the bottom of the wheel. In other words, the wheels of the vehicle may be angled such that when the vehicle navigates a curve or turn at high speeds, the lean or roll of the vehicle towards the outside of the curve may cause the bottom of the wheel to become flush against the ground. This results in better grip when navigating corners.

However, in systems implementing a fixed wheel camber angle, adjusting a vehicle's wheel camber angle requires intrusive and time-intensive manual adjustments to the suspension system. Moreover, selecting the optimal camber angle requires estimating the terrain and vehicle's speed. During the operation of consumer, commercial, or off-road vehicles, speed and terrain can change unpredictably, thus causing grip, stability, and comfort of the passenger to suffer. Additionally, conventional systems are unable to maintain the stability or level of the vehicle cabin during a turn. Therefore, there exists a need to dynamically adjust the camber angle of the wheels to provide a better camber angle for all situations.

SUMMARY OF THE DISCLOSURE

This disclosure relates generally to suspension systems for vehicles that allow dynamic adjustment of wheel camber angle. As used herein, a vehicle's wheel camber angle refers to the angle between the vertical axis of the wheel and the vertical axis of the vehicle. In some embodiments, a vehicle suspension system can include a wheel arch. For example, the wheel arch can be formed as a semicircle.

In some embodiments, a suspension system for a vehicle can include a wheel arch including a gear track. In some embodiments, a wheel axle is coupled to a first and second end of the wheel arch. In some embodiments, a steradian shaped wheel is mounted on the wheel axle. In some embodiments, a motor frame is coupled to the chassis of the vehicle and includes a lean motor configured to engage with the gear track, wherein actuation of the lean motor causes the wheel arch to rotate along an axis perpendicular to the longitudinal axis of the vehicle to create a change in a camber angle of the wheel.

In some embodiments, the lean motor may change the camber angle of the wheel in accordance with the driving conditions of the vehicle. For example, if the vehicle performs a turn at high speed, the lean motor may dynamically change the camber angle to offset the lean experienced by the vehicle. As a further example, if the vehicle negotiates rough terrain, the lean motor may dynamically change the camber angle to maximize the contact between the tires and the terrain.

Thus, in some embodiments, dynamically adjusting the camber angle can increase the stability of the vehicle by reducing or minimizing the roll of the vehicle and increasing the amount of contact between the tires and the terrain. Additionally, a dynamic lean system can compensate for irregularities in road surfaces or terrain. Dynamically adjusting the camber angle can also increase the comfort of the vehicle by keeping the cabin of the car level by reducing or minimizing the roll of the vehicle. Another benefit of adjusting the camber angle is the reduction of wear and tear on the tires during normal usage and turns by the reduction of shearing forces or lateral friction experienced by the tires during turns. Other features, benefits, and advantages will become apparent from the following description and the claims.

DETAILED DESCRIPTION

In the following description, reference is made to the accompanying drawings which form a part hereof, and in which it is shown by way of illustration specific embodiments that can be practiced. It is to be understood that other examples can be used and structural changes can be made without departing from the scope of the examples of the disclosure.

In some embodiments, a suspension system for a vehicle can include a wheel arch including a gear track. In some embodiments, a wheel arch including a gear track can comprise a ring gear where a gear track may be located on an interior surface of the ring gear. In some embodiments, a wheel axle is coupled to a first and second end of the wheel arch. In some embodiments, a steradian shaped wheel is mounted on the wheel axle. In some embodiments, a motor frame is coupled to the chassis of the vehicle and includes a lean motor configured to engage with the gear track, wherein actuation of the lean motor causes the wheel arch to rotate along an axis perpendicular to the longitudinal axis of the vehicle to create a change in a camber angle of the wheel.

In some embodiments, the lean motor may change the camber angle of the wheel in accordance with the driving conditions of the vehicle. For example, if the vehicle performs a turn at high speed, the lean motor may dynamically change the camber angle to offset the lean experienced by the vehicle. As a further example, if the vehicle negotiates rough terrain, the lean motor may dynamically change the camber angle to maximize the contact between the tires and the terrain.

Thus, in some embodiments, dynamically adjusting the camber angle can increase the stability of the vehicle by reducing or minimizing the roll of the vehicle and increasing the amount of contact between the tires and the terrain. Additionally, a dynamic lean system can compensate for irregularities in road surfaces or terrain. Dynamically adjusting the camber angle can also increase the comfort of the vehicle by keeping the cabin of the car level by reducing or minimizing the roll of the vehicle. Another benefit of adjusting the camber angle is the reduction of wear and tear on the tires during normal usage and turns by the reduction of shearing forces or lateral friction experienced by the tires during turns. Other features, benefits, and advantages will become apparent from the following description and the claims.

Figure 1:
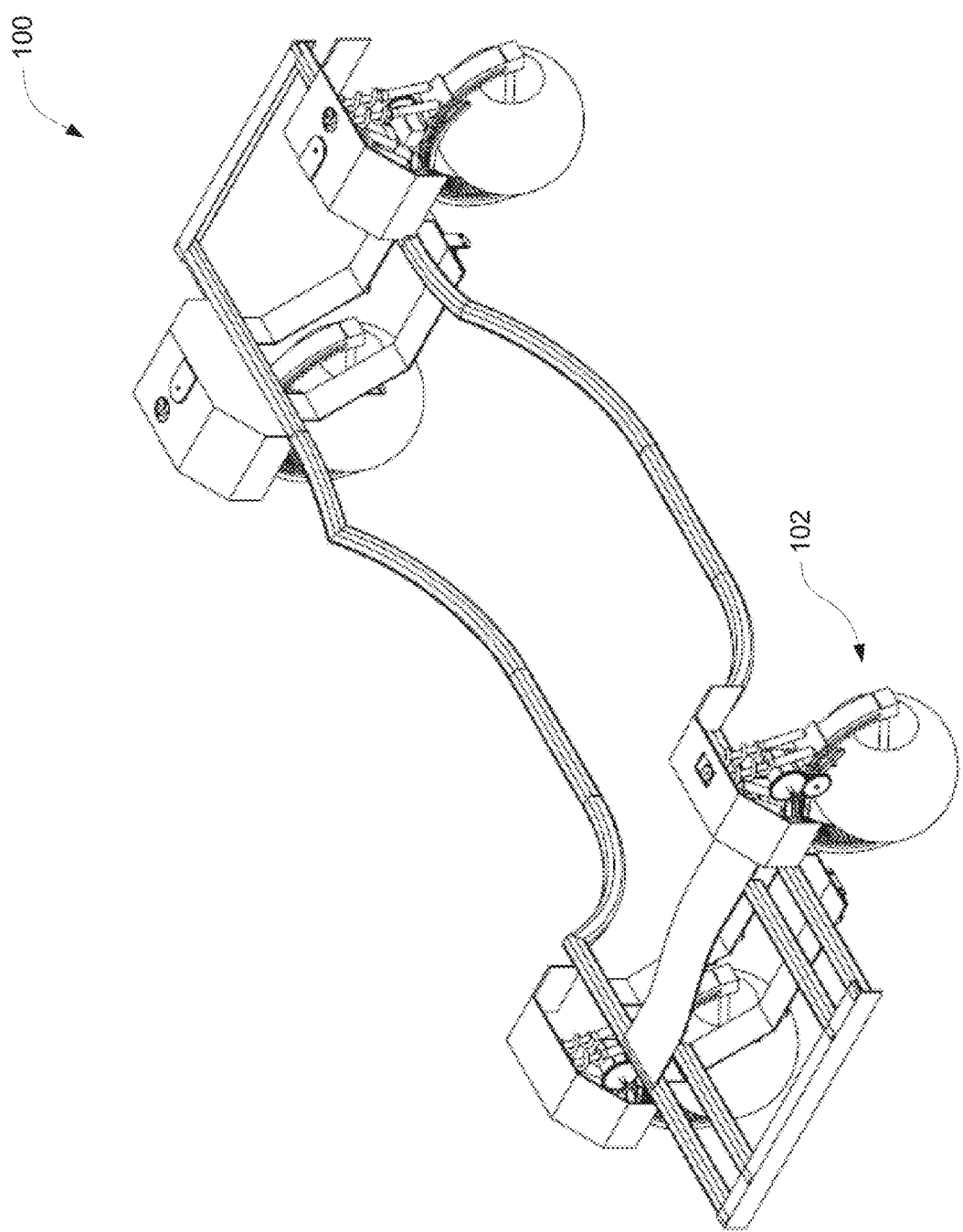
FIG. 1 illustrates an exemplary vehicle chassis in accordance with some embodiments of the disclosure.

FIG. 1 illustrates an exemplary vehicle chassis 100 in accordance with some embodiments of the disclosure. In some embodiments, vehicle chassis 100 can be any type of vehicle chassis commonly known in the art. For example, vehicle chassis 100 can include a chassis frame, a wheel well, and drivetrain system. In some embodiments, vehicle chassis 100 includes a wheel lean system 102. As will be described in further detail below, wheel lean system 102 includes a steradian shaped wheel and a wheel lean and camber angle adjustment mechanism, for example.

Figure 2:
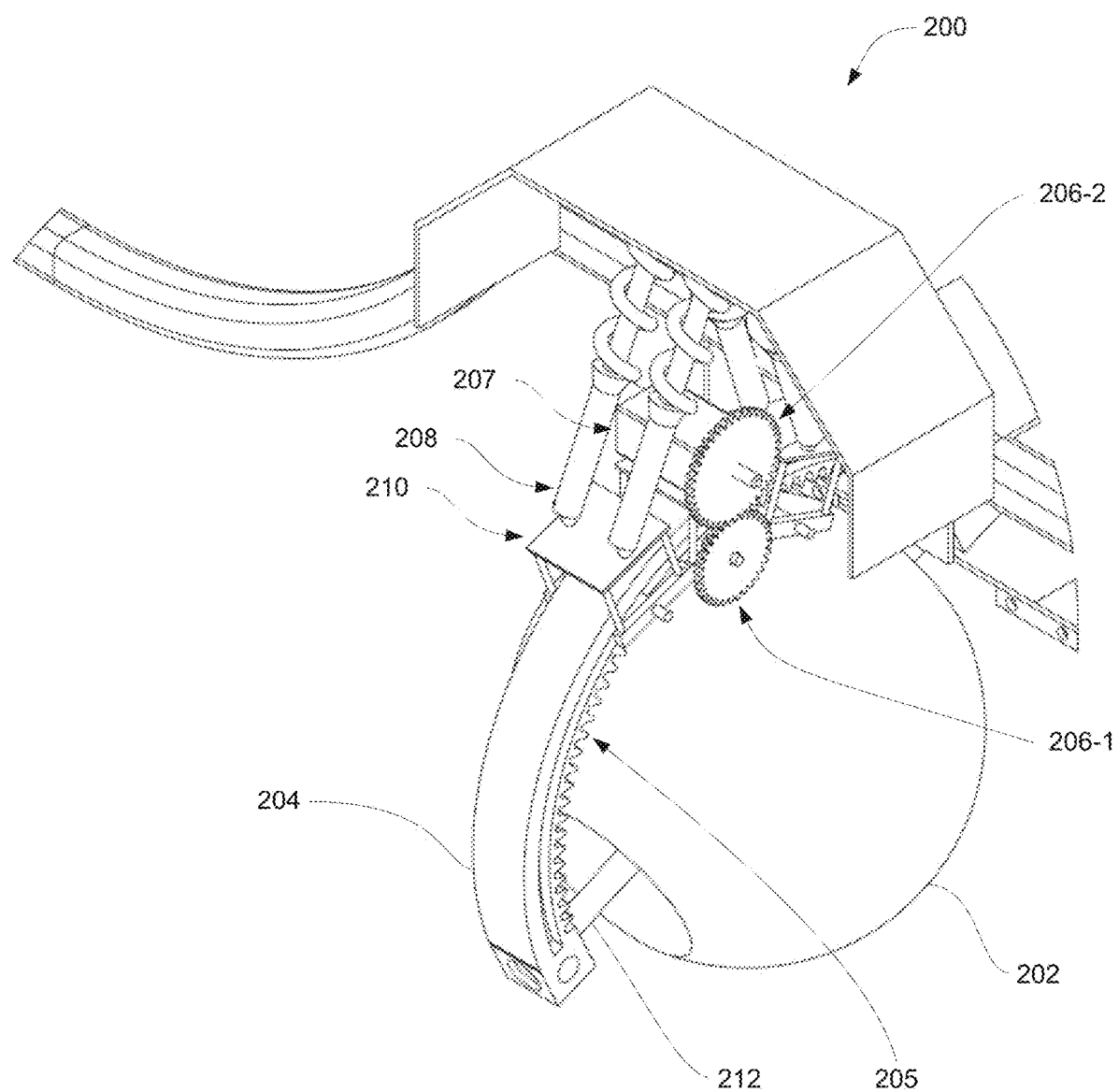
FIG. 2 illustrates an exemplary wheel leaning system in accordance with some embodiments of the disclosure.

FIG. 2 illustrates an exemplary wheel leaning system 200 in accordance with some embodiments of the disclosure. In some embodiments, wheel leaning system 200 includes a steradian shaped wheel 202, a wheel arch 204, motor frame 210, and wheel axle 212. In some embodiments, steradian shaped wheel 202 consists of a spherical or substantially spherical shape (e.g., 5% or 10% tolerance). In some embodiments, a 20% tolerance may be acceptable for a substantially spherical shape. For example, the area of contact of steradian shaped wheel 202 with a road surface remains substantially constant or constant regardless of the rotation of the wheel. In some embodiments, steradian shaped wheel 202 is a solid rubber wheel or an air filled shell with a rubber outer layer, such as in conventional tires. In some embodiments, steradian shaped wheel 202 has a smooth surface. In some embodiments, the surface of steradian shaped wheel 202 can be textured to improve gripping ability or prevent hydroplaning by directing water away from the wheel according to techniques known in the art. In some embodiments, steradian shaped wheel 202 is mounted on wheel axle 212. Wheel axle 212 can be any type of axle system known in the art. In some embodiments, the two ends of wheel axle 212 are coupled to the two ends of wheel arch 204. In some embodiments, wheel axle 212 can extend beyond the end of wheel arch 204 and attach to the drivetrain of the vehicle (e.g., using traditional control arms and ball joints). In some embodiments, disc brakes can be mounted on the inner side (e.g., toward the center of the vehicle, or where the control arms attach to the wheel) of the steradian shaped wheel 202. In some embodiments, the disc brakes can be mounted on the wheel arch 304. In some embodiments, the brakes can be mounted using rigid or semi-rigid control arms mounted on other areas of the vehicle chassis.

Figure 7:
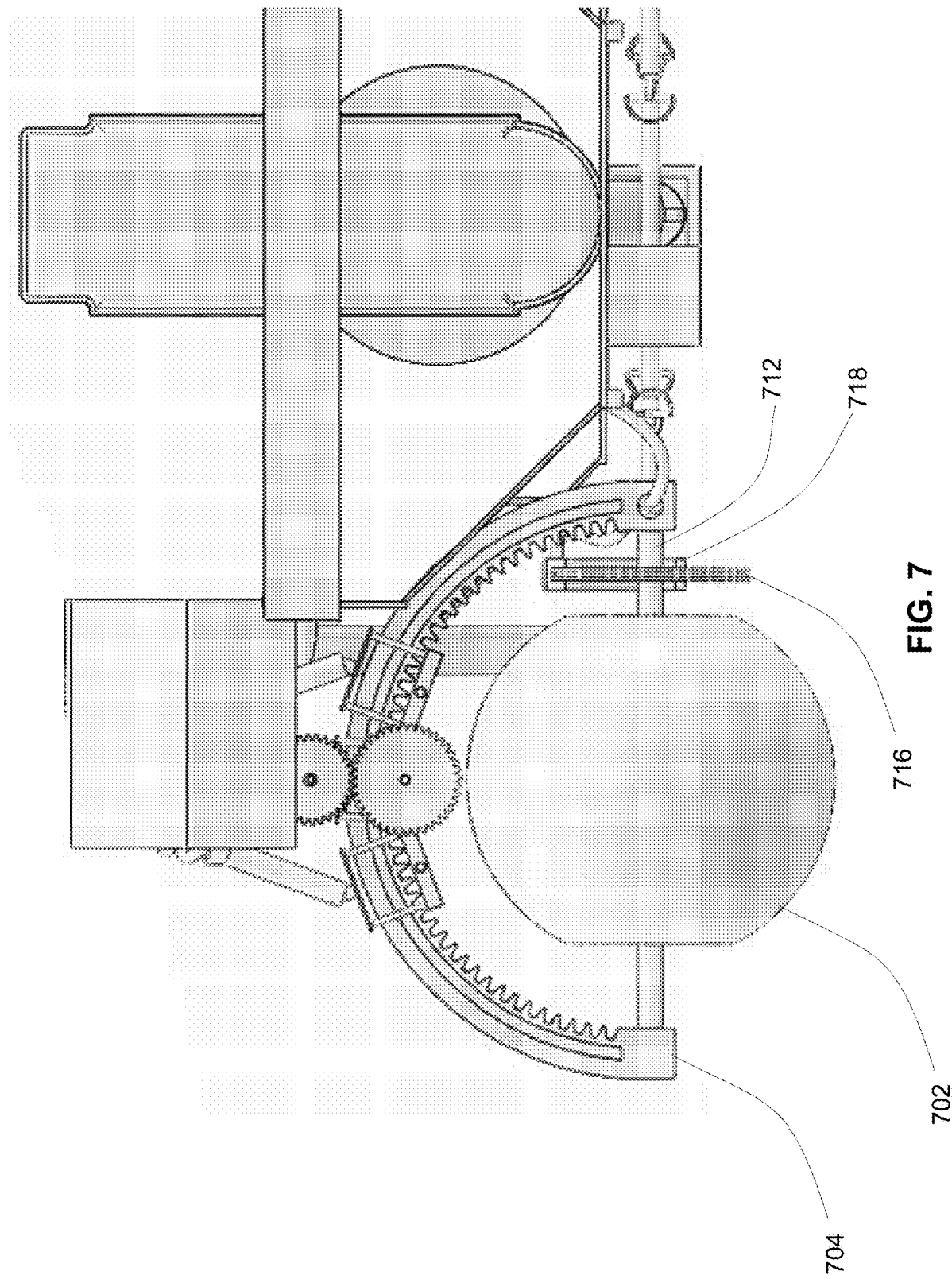
FIG. 7 illustrates an exemplary braking system for a wheel leaning system in accordance with some embodiments of the disclosure.

FIG. 7 illustrates an exemplary braking system in accordance with some embodiments of the disclosure. In some embodiments, a disc 716 may be mounted on wheel axle 712 such that the disc 716 is rotationally fixed relative to the wheel axle 712 (i.e., disc 716 may be subject to the same rotational speed as wheel axle 712). In some embodiments, one or more calipers 718 may be coupled to a wheel frame, which may comprise a steradian shaped wheel 702, wheel arch 704, and/or wheel axle 712. In some embodiments, one or more calipers 718 may be configured to grip disc 716, which may cause disc 716 to slow its rotation, which may in turn cause wheel axle 712 to slow its rotation. In some embodiments, gripping and releasing disc 716 with calipers 718 may be effected through hydraulic actuation, pneumatic actuation, and/or other suitable means. Although disc 716 in the depicted embodiment is mounted on an interior side of a wheel frame (i.e., towards a center of a vehicle), it is also contemplated that disc 716 can be mounted in other locations as well (e.g., on an exterior side of a wheel frame).

Referring back to FIG. 2, in some embodiments, wheel arch 204 is a semicircle shaped structure, opening downwards. In some embodiments, wheel arch 204 includes gear track 205 formed on the inside surface of wheel arch 204. In some embodiments, gear track 206 can include any number of teeth along the length of gear track 206. In some embodiments, gear track 204 is coupled to lean gear 206-1. In some embodiments, lean gear 206-1 consists of two gears coupled together and sharing the same axis: a first gear with a small radius coupled to the gear track 205, and a second gear with a larger radius coupled to lean gear 206-2 (as will be described in further detail with respect to FIGS. 3-4). In some embodiments, the teeth of the smaller gear of lean gear 206-1 is mated with the teeth of gear track 205 such that the rotation of lean gear 206-1 will cause lean gear 206-1 to "crawl" along gear track 205, similar to that of a rack and pinion gear system. In some embodiments, because lean gear 206-1 is mounted onto motor frame 210 (as will be described below), lean gear 206-1 is substantially fixed in position and rotation of lean gear 206-1 will cause wheel arch 204 to feed horizontally along gear 206-1. In some embodiments, because lean gear 206-1 can be mounted onto motor frame 210 (as will be described below), lean gear 206-1 may be substantially fixed in position and rotation of lean gear 206-1 may cause wheel arch 204 to feed laterally along gear 206-1. For example, rotation of lean gear 206-1 will cause wheel arch 204 to lean inwards or outwards, thereby causing a proportional lean in steradian shaped wheel 202 and changing the camber angle of steradian shaped wheel 202 (as will be described in further detail below).

In some embodiments, lean gear 206-2 is attached to and driven by lean motor 207. In some embodiments, lean motor 207 is coupled to motor frame 210. In some embodiments, motor frame 210 fixes lean motor 207 in position and provides a stable mounting point for the lean motor 207. In some embodiments, motor frame 210 is coupled to lean gear 206-1 and provides a stable mounting point for lean motor 206-1 to couple with lean motor 206-2. In some embodiments, motor frame 210 is coupled to lean motor 206-1 via the axle shaft between the smaller radius gear and the larger radius gear of lean motor 206-1. In some embodiments, motor frame 210 is coupled to the chassis of the vehicle via suspension system 208. In some embodiments, a motor assembly may comprise motor frame 210, lean motor 207, lean motor 206-1, and/or lean gear 206-2. In some embodiments, suspension system 208 can be any of a double coilover strut, a MacPherson strut, a double wishbone strut, any other suitable suspension system, or any combination thereof. As will be described in further detail below, in some embodiments, suspension system 208 is coupled to a steering system. For example, the steering system can cause a change in the direction that the steradian shaped wheel 202 is facing and thus change the direction in which the vehicle travels.

Figure 3:
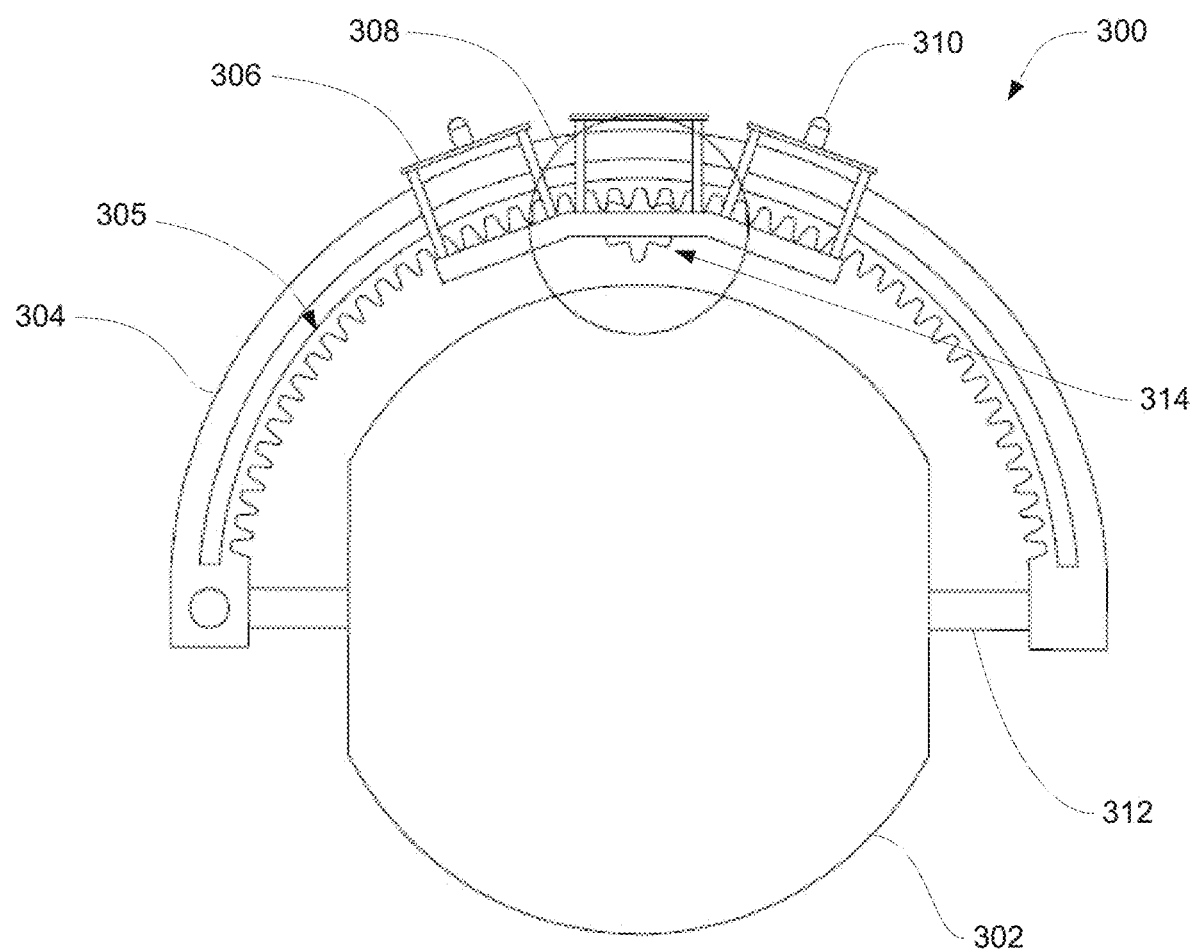
FIG. 3 illustrates an exemplary wheel leaning system in accordance with some embodiments of the disclosure.

FIG. 3 illustrates an exemplary wheel leaning system 300 in accordance with some embodiments of the disclosure. In some embodiments, wheel leaning system 300 is similar to wheel leaning system 200, including steradian shaped wheel 302 coupled to wheel axle 312, wheel arch 304 with gear track 305, and motor frame 306. In some embodiments, motor frame 306 includes suspension mounting points 310 in which the suspension system (e.g., suspension system 208) attaches to motor frame 306. As described above, in some embodiments, motor frame 306 is coupled to smaller gear 314 (e.g., of lean gear 206-1) and holds smaller gear 314 in place. For example, smaller gear 314 is coupled to gear track 305 such that the teeth of smaller gear 314 is enmeshed with the teeth of gear track 305. In some embodiments, rotation of smaller gear 314 (e.g., as a result of a rotation of lean gear 206-1, which is caused by the rotation of lean gear 206-2 and lean motor 207).

Figure 4:
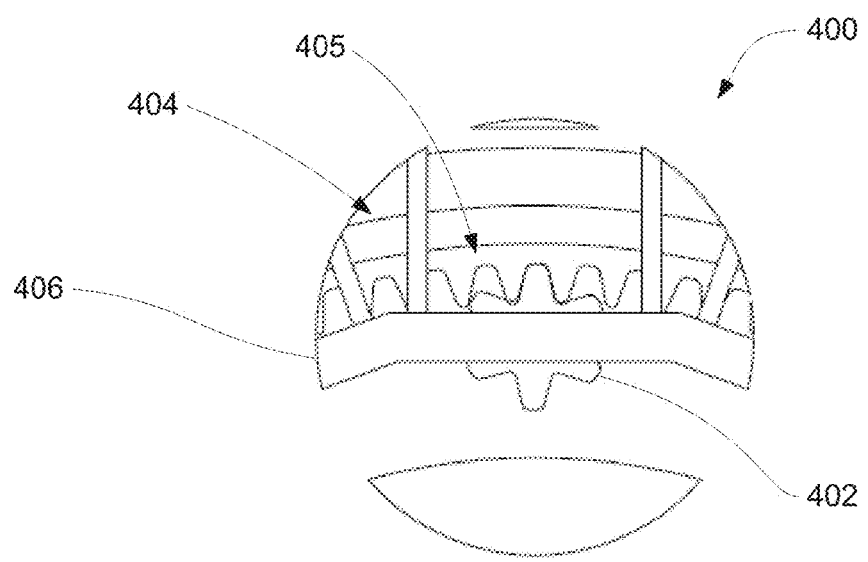
FIG. 4 illustrates an exemplary gear mechanism for a wheel leaning system in accordance with some embodiments of the disclosure.

FIG. 4 illustrates an exemplary gear mechanism 400 for a wheel leaning system in accordance with some embodiments of the disclosure. For example, FIG. 4 illustrates a magnified view of the area delineated as 308 in FIG. 3. As described above, smaller gear 402 is mounted on motor frame 406 and ensures that smaller gear 402 is coupled to gear track 305. In some embodiments, a gear shaft couples smaller gear 402 to a larger gear to create a single lean gear system (e.g., lean gear 206-1). For example, the gear shaft that couples between smaller gear 402 and the larger gear is mounted through the motor frame 406 via a bearing or other suitable mechanism (e.g., the smaller gear 402 and larger gear are mounted on either side of the motor frame).

Figure 5A:
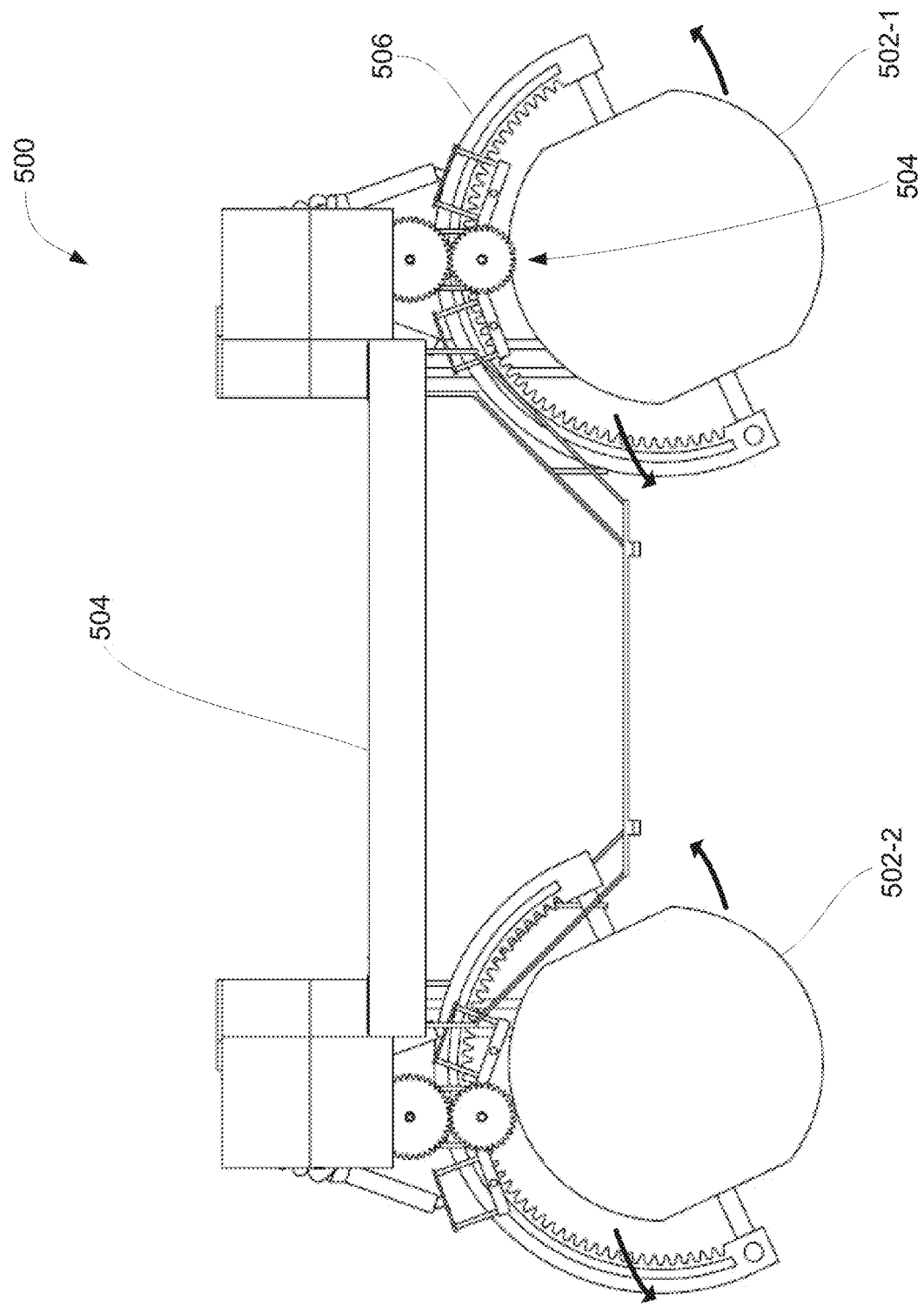
FIGS. 5A-5B illustrate an exemplary wheel lean in accordance with some embodiments of the disclosure.

FIG. 5A illustrates an exemplary wheel lean in accordance with some embodiments of the disclosure. In some embodiments, vehicle chassis 100 includes a wheel lean mechanism as disclosed above and a vehicle frame 504. In some embodiments, the vehicle frame 504 attaches to the driver's side and passenger's side suspension and wheel system and fixes the wheels in place. In some embodiments, as a result actuating the lean motor (e.g., lean motor 207), lean gear 504 has moved along the gear track of wheel arch 506 such that steradian shaped wheel 502-1 and 502-2 is turned to an angle proportional to the movement of lean gear 504 along the gear track (e.g., the wheel camber is adjusted). In FIG. 5A, the motion of the rotation of the wheels is shown with arrows. In some embodiments, because of the spherical shape of the steradian shaped wheel 502-1 and 502-2, the wheels maintain the same or substantially the same amount of contact with the road surface throughout the lean transition and after the transition (e.g., 1%, 5%, or 10% change in contact).

In some embodiments, actuation of the lean motor to cause a proportionate change in the camber angle of the wheel is controlled by the electronic control unit (ECU) or other suitable computer processor system of the vehicle. In some embodiments, the computer processor system can receive inputs from sensors on the vehicle, the wheel, or the wheel lean system 500 that detect road conditions. In some embodiments, the computer processor can perform a search algorithm to find the camber angle that provides the maximum contact with the surface (e.g., on uneven surfaces). In some embodiments, the computer processor can automatically cause an appropriate lean (e.g., select a camber angle) based on the speed of the vehicle and the turn rate. For example, if the vehicle is travelling slowly and performing a wide turn, little or no lean or camber is required. However, if the vehicle is travelling quickly or performing a tight turn, a larger lean may be required to preserve the stability of the vehicle. In some embodiments, the amount of lean is substantially equal to the amount of natural roll that the vehicle experiences when negotiating a turn (e.g., 1%, 5%, 10% of the angle of roll). In some embodiments, the amount of lean selected is based on a look-up table that is calibrated to the vehicle. In some embodiments, the amount of lean selected is dynamically determined based on the roll conditions experienced by the vehicle. In some embodiments, sensors on the vehicle can provide information about roll conditions, road conditions, and/or tire slip conditions, and these sensors can provide inputs to the computer processor to determine the proper lean angle. In some embodiments, the amount of lean can be determined to maximize the amount of grip with the road, to allow for maneuvering around difficult and uneven terrain, and/or to improve the comfort of the vehicle occupants (e.g., by keeping the vehicle cabin level and stable).

Figure 5B:
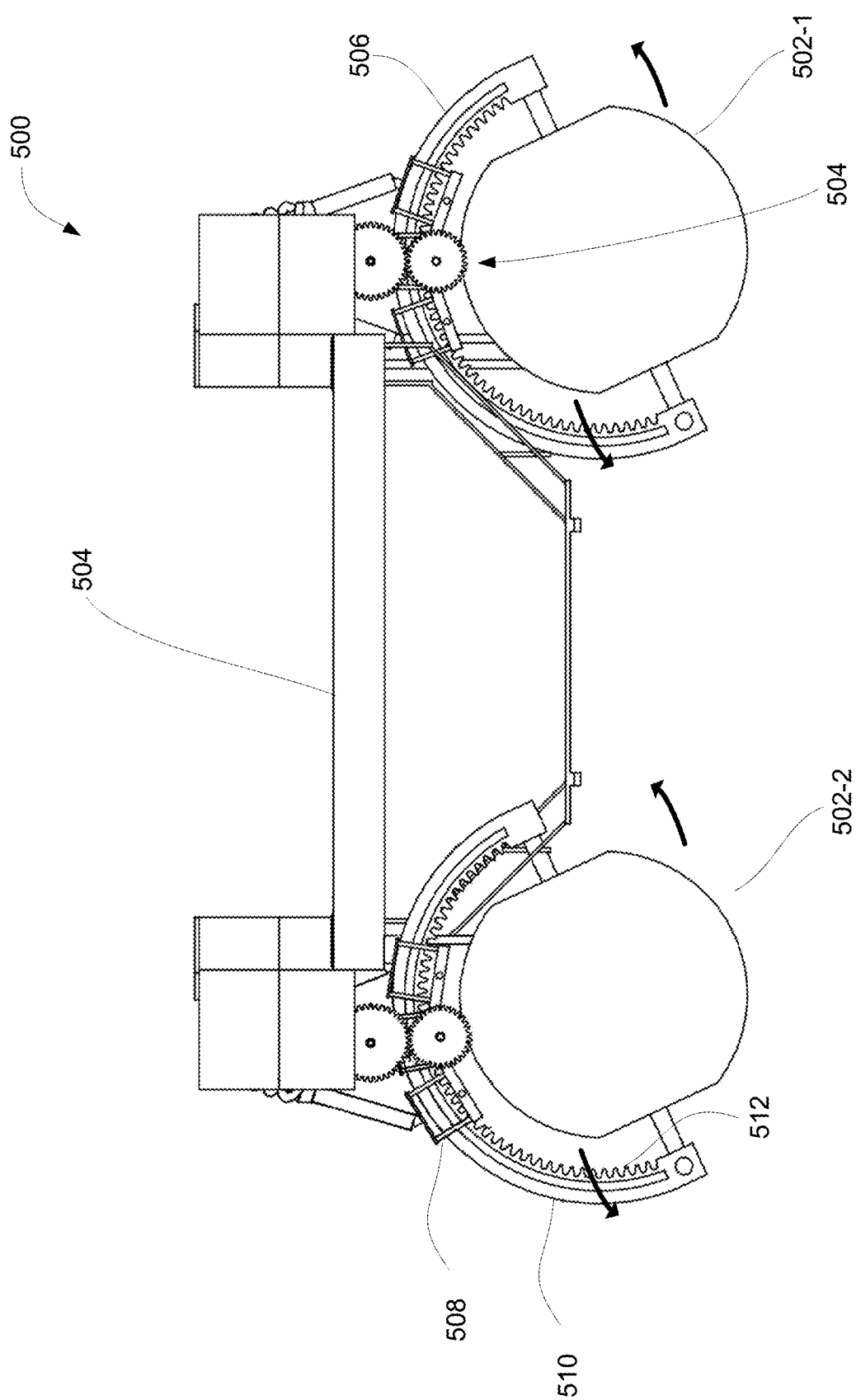

FIG. 5B illustrates an exemplary wheel lean in accordance with some embodiments of the disclosure. In some embodiments, a motor assembly 508 may move along a gear track 512, which may be located on an interior side of wheel arch 510.

Figure 6:
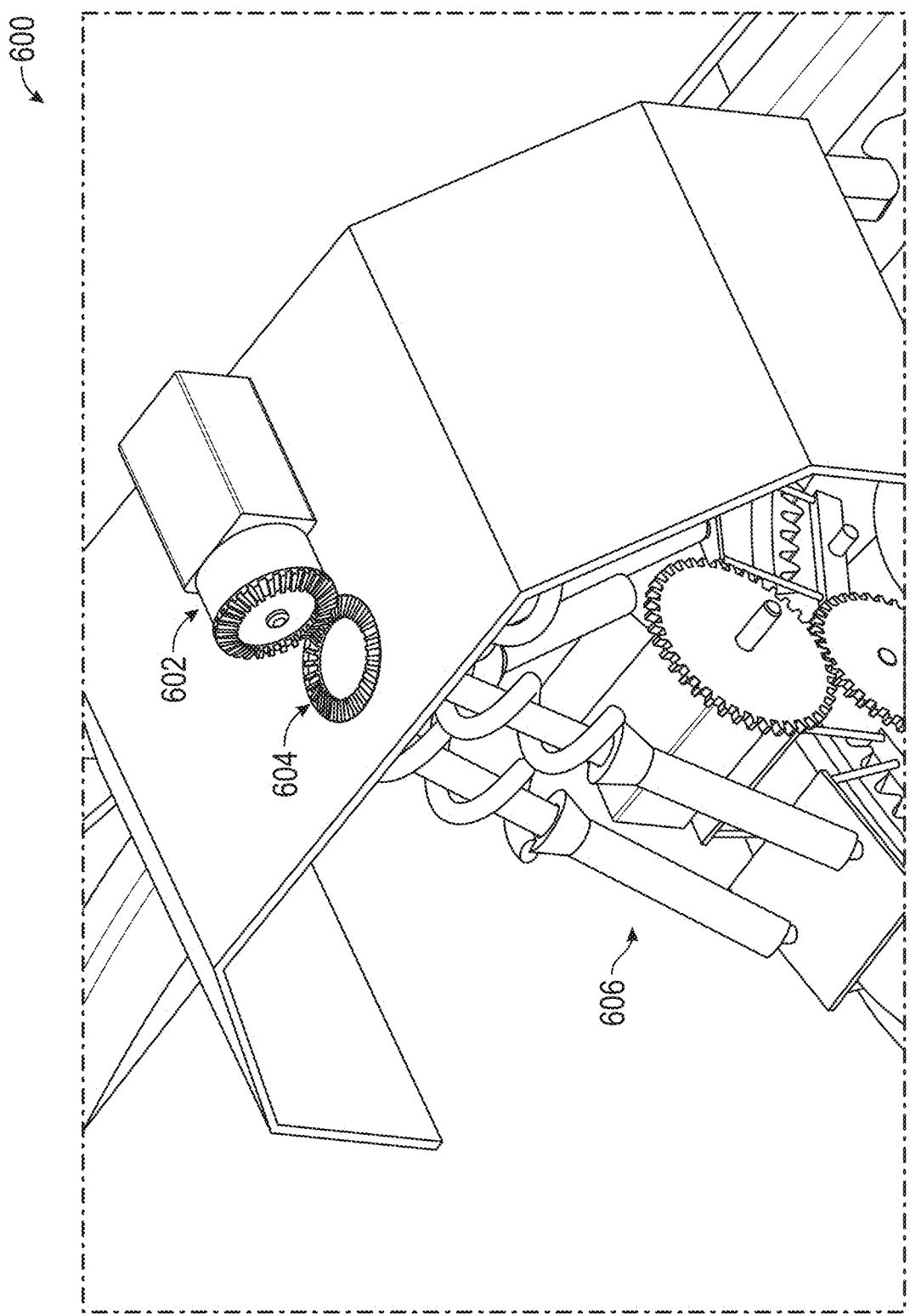
FIG. 6 illustrates an exemplary steering mechanism for a wheel leaning system in accordance with some embodiments of the disclosure.

FIG. 6 illustrates an exemplary steering mechanism for a wheel leaning system 600 in accordance with some embodiments of the disclosure. Wheel leaning system 600 is similar to wheel leaning systems disclosed above (e.g., wheel leaning system 200). In some embodiments, suspension system 606 is coupled to overhead turntable gear 604. In some embodiments, rotation of overhead turntable gear 604 causes a proportionate rotation of suspension system 606. As a result, the wheel arch is rotated causing the wheel to rotate and change direction. Thus, rotation of overheard turntable gear 604 provides steering control of the vehicle. In some embodiments, steering motor 602 is coupled to overhead turntable gear 604, similar to bevel gears or hypoid gears. For example, actuation of steering motor 602 will cause a proportionate rotation in overhead turntable gear 604. Thus, in some embodiments, steering motor 602 and overheard turntable gear 604 provide a steering mechanism for wheel leaning system 600. In some embodiments, other steering mechanisms are contemplated, such as a differential wheel steering (e.g., driving each wheel at differing rotational velocities) or a rack and pinion steering mechanism, such as those known in the art.

Therefore, according to the above, some embodiments of the disclosure are related to a suspension system for a vehicle, comprising a wheel arch including a gear track; a wheel axle coupled to a first and a second end of the wheel arch; a steradian shaped wheel mounted on the wheel axle; and a motor frame coupled to a chassis of the vehicle, wherein the motor frame includes: a lean motor configured to engage with the gear track, wherein actuation of the lean motor causes the wheel arch to rotate along an axis perpendicular to the longitudinal axis of the vehicle to create a change in a camber angle of the wheel.

In some embodiments, the lean motor comprises a lean gear coupled to a shaft of the lean motor, wherein a tooth of the lean gear is engaged with a tooth of the gear track of the wheel arch; and actuation of the lean motor comprises rotating the lean gear, thereby producing a proportionate rotation in the wheel arch. In some embodiments, during actuation of the lean motor, the motor frame remains substantially level relative to the chassis of the vehicle. In some embodiments, during actuation of the lean motor, a contact area of the wheel with a road surface remains substantially constant. In some embodiments, a suspension assembly coupled to the chassis of the vehicle and the motor frame. In some embodiments, the suspension assembly comprises dual coilover struts, MacPherson struts, double wishbone struts, or a combination thereof.

In some embodiments, a steering mechanism coupled to the suspension assembly, wherein actuation of the steering mechanism causes the suspension assembly to change an angle of the wheel relative to a longitudinal axis of the vehicle. In some embodiments, the steering mechanism comprises an overhead turntable gear and a steering motor on the chassis of the vehicle, coupled to the overhead turntable gear; and actuation of the steering mechanism comprises actuating the steering motor to cause a rotation in the overhead turntable gear thereby causing the suspension assembly to change the angle of the wheel relative to the longitudinal axis of the vehicle. In some embodiments, the steering mechanism includes any one of a turn-table gear, a rack and pinion, or a differential wheel steering mechanism.

In some embodiments, the suspension system is coupled to a drivetrain assembly of the vehicle. In some embodiments, coupling the suspension system to the drivetrain assembly of the vehicle includes coupling one or more control arms to the chassis of the vehicle and a wheel frame. In some embodiments, actuation of the lean motor is based on an input from a sensor configured to detect at least one of road conditions and driving conditions. In some embodiments, actuation of the lean motor is controlled by a computer processor of the vehicle. In some embodiments, a disc brake system is coupled to a wheel frame of the suspension system.

Figure 8:
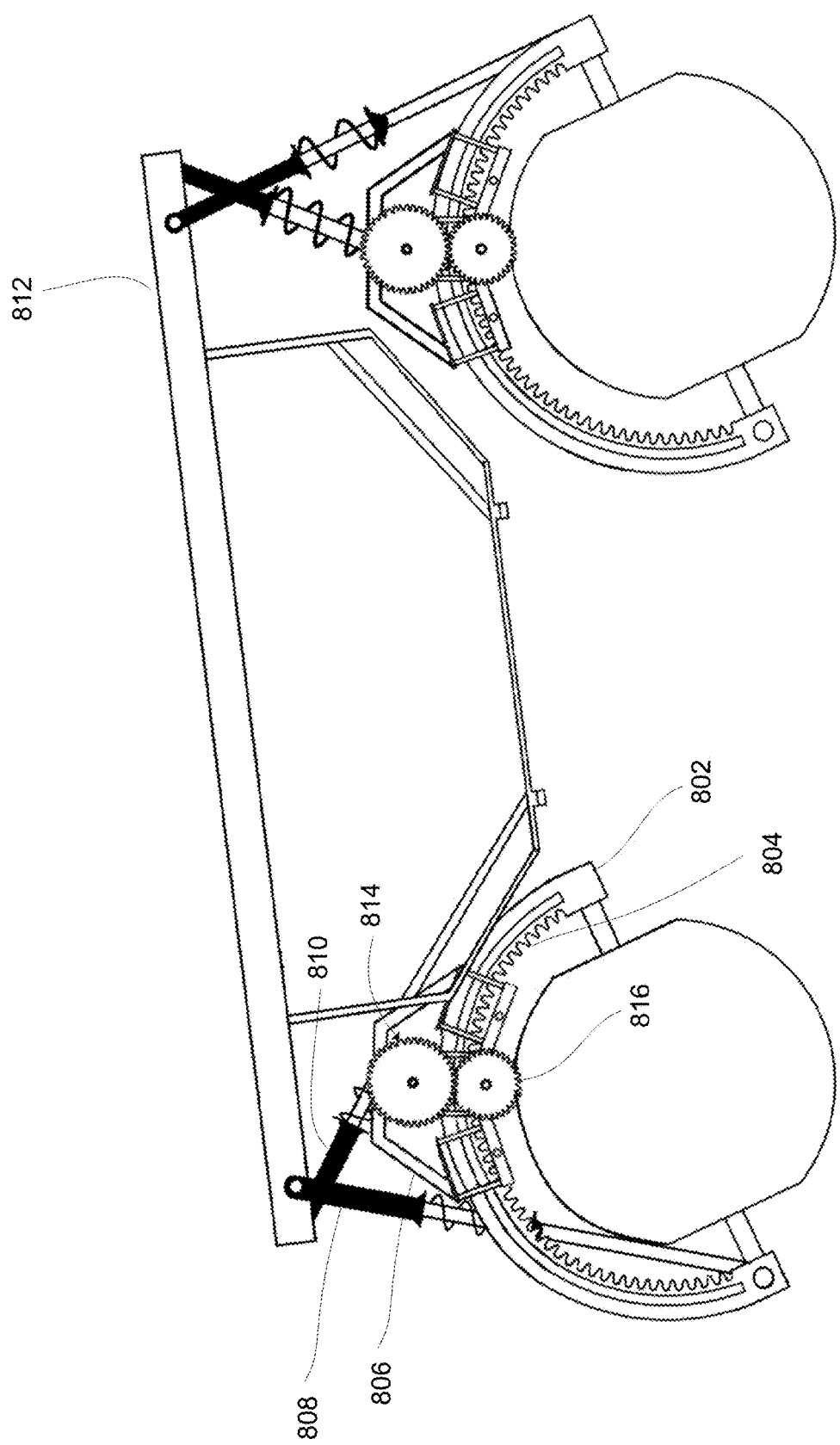
FIG. 8 illustrates an exemplary embodiment of a suspension system according to some embodiments of the disclosure.

FIG. 8 illustrates an exemplary embodiment of a suspension system according to some embodiments of the disclosure. Wheel arch 802 may comprise an inner gear track 804. Motor assembly 806 may be configured to move along inner gear track 804 (e.g., by engaging inner gear track 804 using a smaller gear which may be attached to lean gear 816). Motor assembly 806 and wheel arch 802 may be connected to a chassis 812 via one or more struts 808 and 810. Struts 808 and 810 can be a MacPherson strut, a double wishbone strut, and/or any other suitable structure. Strut 808 can be pivotably attached to chassis 812 at a first end (i.e., strut 808 may pivot about a fixed point on chassis 812). Strut 808 can be pivotably attached to wheel arch 802 at a second end, which may be opposite the first end. Strut 808 may pivotably attach to an exterior end of wheel arch 802 (depicted in FIG. 8), to an interior end of wheel arch 802, and/or other locations along wheel arch 802. Strut 810 may be pivotably attached to chassis 812 at a first end, and may be pivotably attached to motor assembly 806 at a second end, which may be opposite the first end. Strut 810 may pivotably attach to motor assembly 806 via a rear portion of lean motor 814 and/or any other portion of motor assembly 806.

In some embodiments, struts 808 and 810 can function to tilt and/or lean chassis 812 as motor assembly 806 traverses inner gear track 804. It can be beneficial to tilt and/or lean chassis 812 to reduce lateral forces experienced by passengers riding in chassis 812 (e.g., when chassis 812 is experiencing a turn at high speeds). Without tilting and/or leaning chassis 812, a centrifugal force experienced by passengers riding in chassis 812 may be substantially perpendicular to a vector normal to chassis 812. Chassis 812 may lean such that a centrifugal force experienced by passengers riding in chassis 812 may become more parallel to a vector normal to chassis 812, which may result in passengers experiencing more of the centrifugal force pushing the passengers down into their seats, as opposed to laterally out of their seats. Struts 808 and 810 may also function as shock absorbers via the use of springs, dampening (e.g., pneumatic), and/or other suitable methods.

Although embodiments have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A suspension system for a vehicle, comprising:
a wheel arch including a gear track;
a wheel axle coupled to a first and a second end of the wheel arch;
a steradian shaped wheel mounted on the wheel axle; and
a motor frame coupled to a chassis of the vehicle, wherein the motor frame includes:
a lean motor configured to engage with the gear track, wherein actuation of the lean motor causes the wheel arch to rotate along an axis perpendicular to a longitudinal axis of the vehicle to create a change in a camber angle of the wheel.

2. The suspension system of claim 1, wherein:
the lean motor comprises a lean gear coupled to a shaft of the lean motor, wherein teeth of the lean gear are engaged with teeth of the gear track of the wheel arch; and
the actuation of the lean motor comprises rotating the lean gear, thereby producing a proportionate rotation in the wheel arch.

3. The suspension system of claim 1, wherein:
during the actuation of the lean motor, the chassis of the vehicle tilts such that a bottom portion of the chassis is not parallel with a road surface.

4. The suspension system of claim 1, wherein:
during the actuation of the lean motor, a contact area of the wheel with a road surface remains substantially constant.

5. The suspension system of claim 1, further comprising:
a suspension assembly coupled to the chassis of the vehicle and the motor frame.

6. The suspension system of claim 5, wherein the suspension assembly comprises dual coilover struts, MacPherson struts, double wishbone struts, or a combination thereof.

7. The suspension system of claim 5, further comprising:
a steering mechanism coupled to the suspension assembly, wherein actuation of the steering mechanism causes the suspension assembly to change an angle of the wheel relative to the longitudinal axis of the vehicle.

8. The suspension system of claim 7, wherein:
the steering mechanism comprises an overhead turntable gear and a steering motor on the chassis of the vehicle, coupled to the overhead turntable gear; and
actuation of the steering mechanism comprises actuating the steering motor to cause a rotation in the overhead turntable gear thereby causing the suspension assembly to change the angle of the wheel relative to the longitudinal axis of the vehicle.

9. The suspension system of claim 7, wherein the steering mechanism includes any one of a turn-table gear, a rack and pinion, or a differential wheel steering mechanism.

10. The suspension system of claim 1, wherein:
the suspension system is coupled to a drivetrain assembly of the vehicle.

11. The suspension system of claim 10, wherein coupling the suspension system to the drivetrain assembly of the vehicle includes coupling one or more control arms to the chassis of the vehicle and a wheel frame.

12. The suspension system of claim 1, wherein:
the actuation of the lean motor is based on an input from a sensor configured to detect at least one of: road conditions or driving conditions.

13. The suspension system of claim 1, wherein:
the actuation of the lean motor is controlled by a computer processor of the vehicle.

14. The suspension system of claim 1, further comprising:
a disc brake system coupled to a wheel frame of the suspension system.

15. The suspension system of claim 1, further comprising:
a first strut coupled to the wheel arch, wherein the first strut is further coupled to the chassis; and
a second strut coupled to the motor frame, wherein the second strut is further coupled to the chassis.

16. The suspension system of claim 15, wherein the first strut is coupled to the first end of the wheel arch.

17. The suspension system of claim 15, wherein the second strut is coupled to the lean motor.

18. The suspension system of claim 15, wherein:
during the actuation of the lean motor, the chassis of the vehicle tilts such that a bottom portion of the chassis is not parallel with a road surface.

19. The suspension system of claim 1, wherein:
during the actuation of the lean motor, the motor frame remains substantially level relative to the chassis of the vehicle.

* * * * *